United States Patent
Kishimoto

(10) Patent No.: US 10,040,918 B2
(45) Date of Patent: Aug. 7, 2018

(54) GAS BARRIER SHEET AND MANUFACTURING METHOD THEREOF

(75) Inventor: Yoshihiro Kishimoto, Kashiwa (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 223 days.

(21) Appl. No.: 13/094,255

(22) Filed: Apr. 26, 2011

(65) Prior Publication Data

US 2011/0281106 A1    Nov. 17, 2011

(30) Foreign Application Priority Data

May 17, 2010   (JP) ................................ 2010-112953

(51) Int. Cl.
  *B32B 5/16*     (2006.01)
  *C23C 16/513*   (2006.01)
  *C23C 14/34*    (2006.01)
  *B32B 15/04*    (2006.01)
  *C08J 7/04*     (2006.01)

(52) U.S. Cl.
  CPC ........... *C08J 7/045* (2013.01); *Y10T 428/256* (2015.01); *Y10T 428/31678* (2015.04)

(58) Field of Classification Search
  USPC ........................................................ 428/328
  See application file for complete search history.

(56) References Cited

U.S. PATENT DOCUMENTS

| | | | | |
|---|---|---|---|---|
| 4,882,216 A | * | 11/1989 | Takimoto | C08G 59/66 174/254 |
| 5,225,273 A | * | 7/1993 | Mikoshiba | C23C 14/024 428/212 |
| 5,948,515 A | * | 9/1999 | Tsunekawa | C08J 7/04 428/214 |
| 6,162,532 A | * | 12/2000 | Black | B82Y 25/00 427/128 |
| 7,057,251 B2 | * | 6/2006 | Reid | 257/432 |
| 7,732,038 B2 | * | 6/2010 | Naito | H01J 11/10 174/389 |
| 2005/0029513 A1 | * | 2/2005 | Kawashima et al. | 257/40 |

(Continued)

FOREIGN PATENT DOCUMENTS

| | | |
|---|---|---|
| JP | 07-080984 A1 | 3/1995 |
| JP | 10-151696 A | 6/1998 |

(Continued)

OTHER PUBLICATIONS

Scatter. Oxford Dictionaries. Oxford University Press, n.d. Web. Sep. 25, 2015. <http://www.oxforddictionaries.com/us/definition/american_english/scatter>.*

(Continued)

*Primary Examiner* — Cheng Huang

(74) *Attorney, Agent, or Firm* — Burr & Brown, PLLC

(57) ABSTRACT

A gas barrier sheet improved in a gas barrier property and a manufacturing method thereof are provided. A gas barrier sheet includes at least a base material and a gas barrier film provided on the base material which allows a ferromagnetic element to be present at the boundary of the gas barrier film on the side at which the gas barrier film 3 faces the base material. The ferromagnetic element is preferably present in a scattered form, an island form or a thin film form at a boundary.

9 Claims, 3 Drawing Sheets

(56) References Cited

U.S. PATENT DOCUMENTS

| | | | |
|---|---|---|---|
| 2007/0178229 A1* | 8/2007 | Bergendahl | C23C 16/4417 427/127 |
| 2008/0102260 A1 | 5/2008 | Hongu et al. | |
| 2009/0181244 A1* | 7/2009 | Fukugami | B32B 27/08 428/336 |
| 2011/0244114 A1* | 10/2011 | Lowery | G11B 5/70678 427/8 |

FOREIGN PATENT DOCUMENTS

| | | |
|---|---|---|
| JP | 2000-015737 A1 | 1/2000 |
| JP | 2004-160836 A1 | 6/2004 |
| JP | 2006-256091 A1 | 9/2006 |
| JP | 2008-110522 A1 | 5/2008 |
| JP | 2010-053447 A | 3/2010 |

OTHER PUBLICATIONS

Japanese Office Action (With English Translation), Japanese Application No. 2010-112953, dated Dec. 3, 2013 (6 pages).

* cited by examiner

GAS BARRIER SHEET AND MANUFACTURING METHOD THEREOF

CROSS REFERENCE TO RELATED APPLICATIONS

This application is based upon the prior Japanese Patent Application No. 2010-112953 filed on May 17, 2010, the entire contents of which are incorporated herein by reference.

BACKGROUND OF THE INVENTION

1. Field of the Invention

The present invention relates to a gas barrier sheet improved in gas barrier properties and a manufacturing method thereof.

2. Description of the Related Art

Gas barrier sheets have barrier properties to oxygen or water vapor and such gas barrier sheets have been proposed which includes inorganic oxide films comprising silicon oxide or aluminum oxide formed on a base material as a gas barrier film. Such gas barrier sheets are excellent in transparency and thereby the demand for gas barrier sheets has greatly been expected as packaging materials for foods and medicines, as well as protective materials for electronic parts and display devices, and back cover sheet materials for solar cells.

For a film deposition method of a gas barrier film comprising inorganic oxides, ion plating has been adopted in addition to vacuum deposition or sputtering. A gas barrier film deposited by the ion plating is advantageous over a gas barrier film deposited by vacuum deposition in view of adhesion to a base material and denseness and is comparable to the gas barrier film deposited by sputtering. On the other hand, deposition of the gas barrier film by ion plating has a feature that a deposition speed is higher than that of sputtering and is as high as that of vacuum deposition.

In the deposition method of the gas barrier film, a base material is subjected to a pre-treatment just before the deposition of the gas barrier film (refer to Japanese Patent Laid-Open Nos. 7-80984 (paragraph 0016), 2000-15737 (paragraph 0022), 2004-160836 (paragraph 0041), 2006-256091 (paragraph 0027), and 2008-110522 (paragraph 0014)). According to the pre-treatment, obstacles or defects on the surface of the base material are eliminated and the surface is made smooth by modifying the surface of the base material, forming an underlayer film, or applying cleaning, thereby improving the gas barrier properties and the adhesion of the gas barrier film to be formed subsequently.

SUMMARY OF THE INVENTION

Among the existent deposition methods of the gas barrier film, DC sputtering and magnetron sputtering or ion plating and plasma CVD in which deposition is performed under a plasma circumstance involve a problem that the plasma damages the surface of the base material. It is pointed out particularly for resin base materials that the polymer on the surface to be exposed to the plasma is decomposed to cause defects. Accordingly, in order to enhance the gas barrier properties, it is necessary to restrain deposition conditions such as electric power, deposition time and plasma radiation time or subject the gas barrier film to deposition after an underlayer film resistant to plasma has been formed therefor.

The present invention has been made to solve the problems described above, and an object of the present invention is to provide a gas barrier sheet exhibiting a high level of gas barrier property even when a gas barrier film is deposited under a plasma circumstance, and a manufacturing method thereof.

To solve the problems described above, a gas barrier sheet according to the invention comprises a base material; and a gas barrier film provided on the base material; wherein a ferromagnetic element is present at a boundary of the gas barrier film on the side at which the gas barrier film faces the base material.

In the course of the study for improving the gas barrier property of the gas barrier film, the present inventors have happened to find that the gas barrier property is improved, even when the gas barrier film is deposited under a plasma circumstance, in case a ferromagnetic element is allowed to be present slightly at the surface of the base material just before deposition. According to the invention, the gas barrier property of the gas barrier film can be improved by allowing a ferromagnetic element to be present at the boundary of the gas barrier film on the side at which the gas barrier film faces the base material.

In the gas barrier sheet according to the invention, the ferromagnetic element is one or more of iron, nickel, and cobalt. According to the invention, it could be confirmed that the gas barrier property is further improved by the presence of the ferromagnetic element.

In the gas barrier sheet according to the invention, the ferromagnetic element may be distributed at the boundary in a scattered form or an island form or in a thin film form. According to the invention, the gas barrier property can be improved by thinly distributing the ferromagnetic element at the boundary in the scattered form or island form, or uniformly distributing the ferromagnetic element at the boundary in the thin film form.

In the gas barrier sheet according to the invention, the gas barrier film may be one member selected from inorganic oxide films, inorganic nitride films, inorganic carbide films, inorganic oxycarbide films, inorganic carbonitride films, inorganic oxynitride films, and inorganic oxycarbonitride films formed under a plasma circumstance, and the base material comprises a base material sheet or a base material sheet having a planarizing film or other gas barrier films.

A method of manufacturing a gas barrier sheet according to the invention for solving the problems described above includes the steps of preparing a base material, allowing a ferromagnetic element to be present at the base material surface, and forming a gas barrier film under a plasma circumstance on the base material surface in which the ferromagnetic element is allowed to be present. According to the invention, the gas barrier film formed under the plasma circumstance after allowing the ferromagnetic element to be present at the base material surface showes a good gas barrier property. "allow the ferromagnetic element to be present" in the present specification is identical with "distribute the ferromagnetic element in a scattered form or in an island form or a thin film form" and may be replaced each other as described later.

In the method of manufacturing the gas barrier sheet according to the invention, (1) the step of allowing the ferromagnetic element to be present may be performed by a sputtering method, (2) the ferromagnetic element may be supplied from a cathode used in the sputtering method, (3) the ferromagnetic element may be distributed at the base material surface in the scattered form, the island form, or the thin film form, and (4) the base material may comprises a base material sheet or a base material sheet having a planarizing film or other gas barrier film.

According to the gas barrier sheet of the invention and the manufacturing method thereof, the gas barrier property can be improved.

DETAILED DESCRIPTION OF THE INVENTION

Figure 1:
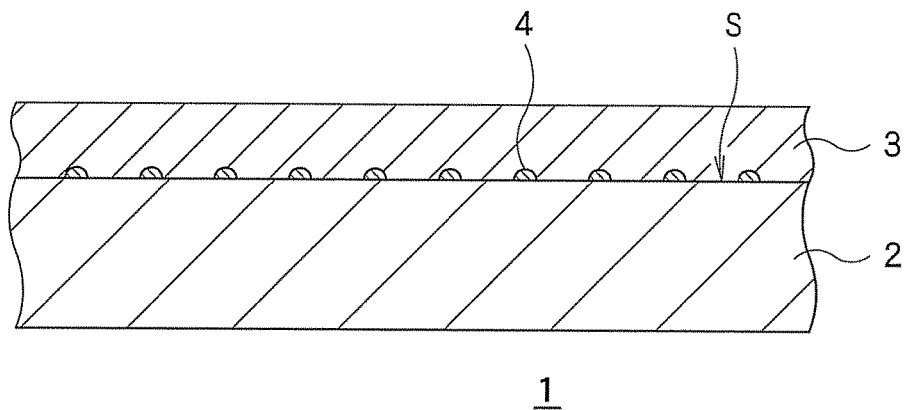
FIG. 1 is a schematic cross sectional view showing an example of a gas barrier sheet according to the invention.

Then, a gas barrier sheet according to an embodiment of the present invention and a manufacturing method thereof will be described in details. The invention is not restricted to the following embodiments but may be practiced in various modifications within the scope of the gist thereof.

[Gas Barrier Sheet]

A gas barrier sheet 1 according to this embodiment at least has a base material 2 and a gas barrier film 3 provided on the base material 2. The invention is characterized in that a ferromagnetic element is present at the boundary S of the gas barrier film 3 on the side at which the gas barrier film 3 faces the base material. The term, "boundary S of the gas barrier film 3 on the side at which the gas barrier film 3 faces the base material", is a boundary between the gas barrier film 3 and a film surface on which the gas barrier film 3 is to be deposited. The term is, for example, a base material surface of the base material 2 shown in FIG. 1, or a film surface of a planarizing film 5 shown in FIG. 2. It is to be noted that, in this embodiment, since the base material surface in FIG. 1 and the film surface of the planarizing film in FIG. 2 are each "a surface of a film on which the gas barrier film 3 is to be deposited", they are collectively referred to as "base material surface S". Further, reference numeral 4 shown in FIG. 1 and FIG. 2 denotes a ferromagnetic element present in the form of a compound.

It has been conventionally recognized as a technical common knowledge that the gas barrier property is lowered if obstacles or impurities are present at the base material surface S on which the gas barrier film 3 is formed. Thus it has been essential that the base material surface S is made smooth and clean so that the obstacles or the impurities are not present at the base material surface S. Accordingly, a pre-treatment has been conducted just before the deposition of the gas barrier film 3 thereby cleaning and planarizing the base material surface S. However, in the course of the study for improving the gas barrier property of the gas barrier film 3, the present inventors have happened to find that the gas barrier property of the gas barrier film 3 is improved when the ferromagnetic element is slightly present at the base material surface S just before deposition. In the gas barrier sheet 1 of this embodiment, the gas barrier property of the gas barrier film 3 can be improved by allowing the ferromagnetic element to be present at the boundary S of the gas barrier film 3 on the side at which the gas barrier film 3 faces the base material.

(Base Material)

The base material 2 is not particularly limited so long as it is a resin sheet or a resin film on which the gas barrier film 3 can be deposited. The constituent material for the base material 2 includes, for example, amorphous polyolefin (APO) type resin such as cyclopolyolefins, polyester resins such as polyethylene terephthalate (PET) and polyethylene 2,6-naphthalate (PEN), polyimide (PI) resin, polyether imide (PEI) resin, polysulfon (PS) resin, polyether sulfon (PES) resin, polyether ether ketone (PEEK) resin, polycarbonate (PC) resin, polyarylate (PAR) resin, cyclopolyolefin (CPO) resin, polypropylene (PP) resin, polyamide (PA) resin, ethylene-tetrafluoroethylene copolymer (ETFE), chlorotrifluoroethylene (PFA), tetrafluoroethylene-perfluoroalkylvinyl ether copolymer (FEP), vinylidene fluoride (PVDF), vinyl fluoride (PVF), and perfluoro-perphloropropylene-perphlorovinyl ether copolymer (EPA). In this embodiment, resin base materials perceptible to plasma damage upon deposition of the gas barrier film under the plasma circumstance can be applied without any problem.

Further, materials used in addition to the resin materials described above include photocurable resins such as resin compositions comprising an acrylate compound having a radical reactive unsaturated compound, resin compositions comprising the above acrylate compound and a mercapto compound having a thiol group, and resin compositions formed by dissolving an oligomer such as epoxy acrylate, urethane acrylate, polyester acrylate, polyether acrylate, and methacrylate into a polyfunctional acrylate monomer, as well as a mixture thereof. Further, one or more of the resins which are stacked by lamination or coating can also be used as the base material 2. Further, in addition to the resin sheet or the resin film, glass or silicon wafer can be used as the base material.

The thickness of the base material 2 is, preferably, about 3 µm or more and 500 µm or less, more preferably, 12 µm or more and about 300 µm or less. The base material 2 whose thickness ranges as above is preferred since the material is flexible and can be taken up into a rolled shape.

The base material 2 may be a long material or sheet-like material, and a long base material can be used preferably. The length of the long base material 2 in the longitudinal direction is not particularly limited and a long film, for example, of 10 m or more can be used preferably. The upper limit of the length is not particularly limited and it may be, for example, about 10 km.

The base material 2 may contain additives for ensuring various performances. For the additives, those known so far can be used properly and include, for example, an anti-blocking agent, a heat stabilizer, an anti-oxidant, and chlorine scavenger. When the base material 2 is used as a substrate for an light emitting device such as OLED that requires transparency, the base material 2 is preferably colorless transparent. More specifically, it is preferable that the base material 2 have a transparency 80% or more in terms of an average optical transmittance, for example, within a range from 400 nm to 700 nm. Since the optical transmittance undergoes the effect of the material and the thickness of the base material 2, the base material is constituted while taking the material and the thickness into consideration.

(Planarizing Film)

Figure 2:
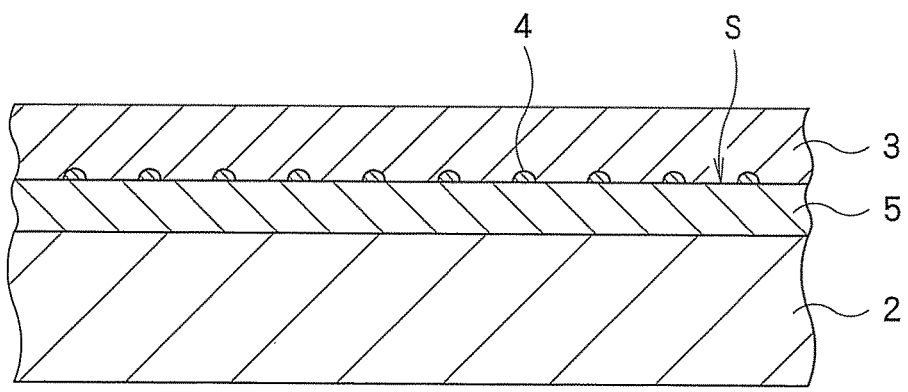
FIG. 2 is a schematic cross sectional view showing another example of a gas barrier sheet according to the invention.

The ferromagnetic element may be present on the base material 2 as shown in FIG. 1 and it may also be present on a planarizing film 5 provided on the base material 2 as shown in FIG. 2. By providing the planarizing film 5 between the base material 2 and the gas barrier film 3, unevenness or protrusion on the surface of the base material 2 can be eliminated and the surface of the base material 2 is made planar. Therefore, the gas barrier film 3 is provided with reduced number of defects and, as a result, the gas barrier property can be improved.

As the planarizing film 5, those known so far can be used properly and materials used therefor include, for example, sol-gel materials, ionizing radiation curable resins, thermosetting resins and photoresist materials. The planarizing film 5 formed of such organic materials is preferred since it also has a stress relaxation function. More specific materials include polymeric compounds containing acrylate as general-purpose material. In addition, more specific materials properly include photo-curable or thermosetting materials such as styrene, phenol, epoxy, nitrile, acryl, amine, ethyleneimine, ester, silicone, cardo polymer, alkyl titanate compound, ionic polymeric complex, etc. and polymeric compounds containing a mixture of a polymeric compound and a hydrolyzate of a metal alkoxide.

Ionizing radiation curable resins are preferably used particularly with a view point of facilitating the formation of a film with a gas barrier function kept. More specifically, ionizing radiation curable resins used preferably are formed by properly mixing reactive prepolymers, oligomers and/or monomers having an acrylate group or an epoxy group. Further, resins can preferably be used which have polymerizable unsaturated bonds in the molecule and are transformed into a three-dimensional polymeric structure by cause a crosslinking polymerization reaction through the radiation of UV light (UV) or electron beams (EB), such as liquid compositions formed into a liquid state by mixing a thermoplastic resin such as urethane, polyester, acryl, butyral, or vinyl type resin optionally to an ionizing radiation curable resin.

The planarizing film 5 can be formed by coating, drying, and curing such a resin by a coating method known so far, for example, roll coating, Mayer bar coating, or a gravure coating. Further, for the formation of the planarizing film 5, a sol-gel material using a sol-gel method, which can form a coating film of a material of a type identical with the gas barrier film 3, is also used preferably with a view point of ensuring preferred adhesion with the gas barrier film. The sol-gel method means a method of coating a coating composition. This method uses as the starting material at least a silane coupling agent having an organic functional group and a hydrolysable group, and a crosslinking compound having an organic functional group that reacts with the organic functional group of the silane coupling agent to form such a coating composition and a coating film. As the silane coupling agent having the organic functional group and the hydrolysable group, those known so far can be used properly. Further, as the material for the planarizing film 5, a cardo polymer known so far is also used preferably with a view point of heat resistance. The thickness of the planarizing film 5 is usually 0.05 µm or more and, preferably, 0.1 µm or more and, usually, 10 µm or less and, preferably, 5 µm or less.

(Ferromagnetic Element)

A ferromagnetic element is present, as shown in FIG. 1 and FIG. 2, at the boundary S (base material surface S) between the base material 2 (planarizing film 5 if provided) and the gas barrier film 3. The ferromagnetic element may include one or more elements of iron, nickel, and cobalt. The ferromagnetic element may be present as a single element (for example, Fe, Ni, Co), or may be present as two or more elements (for example, Fe and Ni, Fe and Co, Ni and Co, Fe, Ni and Co), respectively. Such elements are not inactive to oxygen. Accordingly, it is considered that the elements are present as compounds such as oxides (for example, $Fe_xO_y$), composite oxides of metals and oxides, or nitrides. This is supported based on the result of elemental analysis. In this embodiment, oxides, composite oxides and nitrides of the ferromagnetic elements are collectively referred to as "ferromagnetic element-containing compound 4" and represented by a reference numeral 4 in FIG. 1 and FIG. 2.

A preferred form where the ferromagnetic element is present is such that the ferromagnetic element is distributed uniformly as the ferromagnetic element-containing compound 4 at the base material surface (boundary) S. Specifically, the ferromagnetic element is preferably distributed in the scattered form or island form over the entire surface, or distributed uniformly in the thin film form. "Scattered form" means a situation in which an assembly of atoms or compounds at such an extent as can be detected at least as the ferromagnetic element are distributed discretely as if they were scattered. Also "island form" has the form similar to the scattered form but, more specifically, this conceptually means a state where the elements are distributed as assemblies larger than those in the scattered form. The form where the ferromagnetic element is present in the scattered form or the island form provides uniform distribution density and the elements are not particularly localized in a certain portion.

In the form where the ferromagnetic element is distributed in the scattered form or the island form as the compound (ferromagnetic element-containing compound 4), the thickness of the compound is so small that the presence thereof cannot be confirmed even by cross sectional observation and, for example, it is 0.1 nm or more and 9 nm or less. Further, in a plan view, this is such a distribution as exceeding 0% and less than about 10% in term of the area ratio.

Evaluation for the area ratio described above is difficult. In the examples to be described later, when evaluation for the area ratio is made using XRF (X-ray fluorescence analyzer, model: RIX 3100 manufactured by Rigaku Corporation) for example, an extremely favorable gas barrier property was developed even when the number of counts for Fe is, for example, 1 kcps or less (0.22 kcps to 0.98 kcps in the example). In view of the above, the mode of distribution of the ferromagnetic element can be defined by the number of counts by the X-ray fluorescence analyzer. When the result of measurement for the number of counts obtained by XPS was converted to the content of the ferromagnetic element at the base material surface S, it was within a range from 3 at % to 12 at % being as Fe atoms (ferromagnetic element). It was confirmed that a good gas barrier property can be developed within such a range.

Further, the ferromagnetic element is uniformly distributed in the thin film form as the compound (ferromagnetic element-containing compound 4) in such a manner that the ferromagnetic element is provided over the entire surface of the base material surface S as a film of a predetermined thickness comprising the ferromagnetic element-containing compound 4. Its film thickness should be the lower limit thickness that is recognizable as a film (for example, 10 nm or more). The film thickness may be 15 nm and 20 nm or less at the maximum. It can be said that the thickness of 20 nm or less is such a thin thickness that the gas barrier property is not developed. That is, if the thickness of the ferromagnetic element-containing compound film exceeds 20 nm, this means film per se has the gas barrier property. The ferromagnetic element-containing compound film exceeding a thickness of 20 nm involves an increase in film stress, thereby worsening the gas barrier property.

As described above, the present inventors have found that the gas barrier property was improved by chance when the Fe is allowed to be present in the scattered form or the island form at the base material surface S. Through continued experiment, the present inventors have confirmed that the gas barrier property can be improved also by the ferromagnetic element-containing compound film provided in a thin film form. When the transparency is required for the gas barrier sheet, it is necessary to take care of the film thickness of the ferromagnetic element-containing compound 4, but the ferromagnetic element-containing compound film provided in the thin film form is applicable so long as it is within a range that the film thickness of the ferromagnetic element-containing compound 4 does not inhibit the transparency.

In this embodiment, a gas barrier film 3 is deposited so as to cover the ferromagnetic element present in the scattered form, the island form, or the thin film form (present as the ferromagnetic element-containing compound 4) at the base material surface S. The gas barrier property of the gas barrier sheet 1 obtained as a result could be drastically improved compared with the case where the ferromagnetic element is not present as explained in the examples to be describe later. The reason is that the ferromagnetic ingredient is present as a compound (for example, oxide) and the magnetic property of the compound acts so as to force back or repulse the plasma during deposition of the gas barrier film from the base material surface S toward hearth (on the side of crucible) and, as a result, and the gas barrier film 3 may be formed while decreasing the plasma damage to the base material surface S.

In this embodiment, the ferromagnetic element is always present in the scattered form, the island form, or the thin film form. Other elements or inevitable impurities may also be present in the scattered form, the island form, or the thin film form in the same manner as the ferromagnetic element at the base material surface S together with the ferromagnetic element by means that allowing the ferromagnetic element to be present. Specifically, they include elements such as Cr, Al, Ti, Cu, Mo, Mn, P, S, and Ta which are deposited (present) in the scattered form, the island form, or the thin film form at the base material surface S together with the ferromagnetic element by the deposition means. The elements are present as other elements or inevitable impurities, which are elements that may be present within such a range so as not to hinder the magnetic effect due to the presence of the ferromagnetic element. "deposited" in this embodiment also means "allowed to be present in the scattered form, the island form, or the thin film form" as will be described later and both of them can be replaced with each other.

The ferromagnetic element is allowed to be present at the base material surface S by various methods. The method of allowing the ferromagnetic element to be present at the base material surface S includes methods such as sputtering, PVD, CVD, and ALD. In the method such as sputtering and the CVD, deposition is carried out with the power set at a low level so that the base material surface is not deteriorated by the plasma and the ferromagnetic element is deposited as the ferromagnetic element-containing compound 4 in the scattered form, the island form, or the thin film form.

With the use of a plate (electrode plate) containing a ferromagnetic element as a plasma processing cathode (sometimes referred to as a "sputtering cathode") opposed to the base material surface S, preferred deposition means deposits the ferromagnetic element flying out of the plasma processing cathode as the ferromagnetic element-containing compound 4 such as oxides, composite oxides, or nitrides at the base material surface S. The deposition means can deposit various kinds of ferromagnetic-containing compounds 4 by performing sputtering while variously changing the types of the plasma processing cathode. Further, various gas barrier sheets can be obtained easily by depositing the gas barrier film 3 subsequently under the plasma circumstance. Through the evaluation of the thus-obtained gas barrier sheet, it can easily be evaluated what kind of ferromagnetic element-containing compound 4 and what conditions are to be adopted for the improvement of the gas barrier property.

Further, the ferromagnetic element-containing compound 4 can be formed deposited in the scattered form or the island form, and can be formed in the thin film form in the same manner also by other deposition means. For example, a wet coating method or a spray coating method can be used. Specifically, a ferromagnetic element-containing compound 4 can be obtained by coating, drying, or baking an organometallic compound containing a ferromagnetic element such as Fe. Such means is convenient for forming the ferromagnetic element-containing compound 4 in the thin film form.

In this embodiment, description has been made of an example in which the ferromagnetic element-containing compound 4 is provided at the boundary S (base material surface S) between the base material 2 (planarizing film 5 if provided) and a gas barrier film 3. However, the gas barrier properly may be improved also by previously providing other gas barrier film on the base material 2, then allowing a ferromagnetic element-containing compound 4 to be present on the gas barrier film and, subsequently, forming a gas barrier film 3. "Other gas barrier film" in this case may be a gas barrier film 3 formed under the plasma circumstance identical with that for the gas barrier film 3 to be described later, or may be a further other gas barrier film. "Further other gas barrier film" mentioned referred to herein may include clay compound or resin films such as a sol-gel film, which are not formed under the plasma circumstance, and inorganic films comprising $SiO_x$, $Al_xO_y$, etc. formed by vapor deposition, atomic layer deposition (ALD), or remote plasma method.

(Gas Barrier Film)

The gas barrier film 3 is a film deposited to the base material surface S where the above ferromagnetic element is present under the plasma circumstance as shown in FIG. 1 and FIG. 2. The gas barrier film 3 is not particularly limited so long as it is a film formed under the plasma circumstance, and the gas barrier film 3 includes, for example, those whose gas barrier property is improved by the magnetic effect due to the ferromagnetic element.

Specifically, the bas barrier film may include one of films selected from inorganic oxide ($MO_x$) films, inorganic nitride ($MN_y$) films, inorganic carbide ($MC_z$) film, inorganic oxycarbide ($MO_xC_z$) films, inorganic carbonitride ($MN_yC_z$) films, inorganic oxynitride ($MO_xN_y$) films, and inorganic oxycarbonitride ($MO_xN_yC_z$) films. M may include metal elements such as silicon, zinc, aluminum, magnesium, indium, calcium, zirconium, titanium, boron, hafnium, and barium. In this case, M may be single or two or more elements. Each of the inorganic compounds may specifically include oxides such as silicon oxide, zinc oxide, aluminum oxide, magnesium oxide, indium oxide, calcium oxide, zirconium oxide, titanium oxide, boron oxide, hafnium oxide, and barium oxide; nitrides such as silicon nitride, aluminum nitride, boron nitride, and magnesium nitride; carbides such as silicon carbide; and sulfides. Further, two or more composite materials selected from the inorganic compounds (oxynitrides, oxycarbides, carbonitrides, oxycarbonitrides) may also be used. Further, composite materials containing two or more metal elements such as SiOZn (oxynitrides, oxycarbides, carbonitrides, oxycarbonitrides) may also be used.

Preferred M may include metal elements such as silicon, aluminum, and titanium. In particular, when M is silicon, a gas barrier film 3 comprising silicon oxide is transparent and exhibits high gas barrier property and, further, a gas barrier film 3 comprising silicon nitride exhibits further higher gas barrier property. Particularly composite materials of silicon oxide and silicon nitride (inorganic oxynitride ($MO_xN_y$)) are prefered, in which transparency is improved when the content of the silicon oxide is greater and the gas barrier property is improved when the content of the silicon nitride is greater. Further, a gas barrier film 3 comprising SiOZn in which M comprises silicon and zinc or SiOSn in which M comprises silicon and tin is transparent and exhibits a high gas barrier property.

The gas barrier films 3 are deposited under the plasma circumstance. The deposition method under the plasma circumstance may include sputtering methods such as DC sputtering, magnetron sputtering, and high power pulse sputtering performed under the plasma circumstance; and ion plating method; and CVD methods such as plasma CVD or atmospheric plasma CVD. The deposition method may be selected while the kind of the deposition material, easy deposition, and step efficiency, etc. are taken into consideration.

The plasma upon deposition of the gas barrier film may sometimes give damage to the base material 2. In particular, when a base material 2 made of resin is used, the plasma gives damage such as brittle fracture, ductile fracture, fatigue fracture, craze fracture, boundary fracture, interlayer fracture, stress fracture, and phase separation fracture to the base material 2. It is considered that when the surface of the base material S made of resin is exposed directly to the plasma, the molecular structure of the polymer is disconnected. In this embodiment, the base material surface S where the ferromagnetic element is allowed to be present is a base material to be deposited with the film and, as a result, the gas barrier property of the gas barrier sheet 1 obtained was improved drastically. In view of the above, it is considered that the presence of the ferromagnetic element suppresses the plasma damage to the base material surface S. It is considered that the magnetic property due to the existent ferromagnetic element acts so as to force back or repulse the plasma from the base material surface S toward the hearth (on the side of the crucible) during deposition of the gas barrier film 3. It has been generally considered as a common knowledge that the gas barrier film 3 should be deposited on the base material surface S which is clean and free of impurity materials in order to obtain a high gas barrier property. On the contrary, this embodiment has a feature in improving the gas barrier property by positively allowing the ferromagnetic element to be present at the base material surface S.

The thickness of the gas barrier film 3 is usually 10 nm or more and 500 nm or less. The gas barrier film 3 has such a thickness ranged as above and thus can provide an advantageous effect that the color can be adjusted easily while ensuring the gas barrier property and the flexibility, and the productivity can also be ensured easily.

(Other Film)

The gas barrier sheet 1 according to this embodiment is provided optionally with various films in addition to the planarizing film 5 described above. For example, one of films selected from a transparent conductive film, a hard coat film, a protective film, an antistatic film, an anti-fouling film, an anti-dazzling film, and a color filter may be provided. Among them, the transparent conductive film, the antistatic film, the antifouling film, the anti-dazzling film, or the color filter is preferably provided as the constituent element of the gas barrier sheet 1.

A planarizing film similar to the planarizing film 5 described above may also be formed on the gas barrier film 3. When a planarizing film is formed on the gas barrier film 3, unevenness or protrusion on the surface of the gas barrier film 3 can be eliminated and the surface is made planar. Accordingly, this can provide an advantage that unevenness, roughness, etc. can be eliminated in the application use to displays, particularly, organic EL devices or electronic paper devices. Since the planarizing film formed on the gas barrier film 3 has a similar constitution (material, deposition method, thickness, etc.) with that of the planarizing film 5 described above, description therefor is to be omitted.

A transparent conductive film (not illustrated) can be utilized as an electrode provided on the gas barrier film 3, particularly, when the gas barrier sheet 1 according to this embodiment is used for display devices such as organic EL devices or electronic paper devices. The transparent conductive film is not particularly limited and the material for forming the transparent conductive film may include indium-tin oxide (ITO), indium-tin-zinc oxide (ITZO), $ZnO_2$, CdO and $SnO_2$, the ITO film being particularly preferred. The transparent conductive film can be formed by vacuum deposition methods such as resistance heating vapor deposition, induction heating vapor deposition, EB vapor deposition, sputtering, ion plating, thermal CVD, and plasma CVD. Further, the transparent conductive film may also be a coating film comprising, as a main ingredient, an inorganic oxide formed by coating a hydrolyzate of a metal alkoxide, etc. or a hydrolyzate of transparent conductive particles and a metal alkoxide.

The thickness of the transparent electroconductive film is usually 10 nm or more, preferably, 60 nm or more and, more preferably 100 nm or more. Further, it is usually 1000 nm or less, preferably, 450 nm or less and, more preferably, 200 nm or less.

A hard coat film, a protective film, an antistatic film, an antifouling film, an antidazzling film, and a color filter serving as a functional film other than the planarizing film 5 and the transparent conductive film described above are not explained particularly but known technique can be applied for forming such a film. Further, in the case of a back cover sheet, a hydrolysis resistant film and a sealant film may also be provided. While the explanation is also omitted, known technique can be applied also to such films.

[Method of Manufacturing a Gas Barrier Sheet]

A method of manufacturing a gas barrier sheet 1 according to this embodiment includes a step of allowing a ferromagnetic element to be present at the base material surface S and a step of forming a gas barrier film 3 on the base material surface S where the ferromagnetic element is allowed to be present under a plasma circumstance. Since the steps constituting the manufacturing method have been described in details respectively in the column for explaining "gas barrier sheet" described above, they will be described briefly.

First, a base material 2 is prepared. As the base material 2, various base materials described above can optionally be selected and used. In this embodiment, even base materials made of resin that are susceptible to plasma damage upon deposition of the gas barrier film 3 can be used without any problem. Further, various means for suppressing the effect of the plasma damage, e.g., formation of plasma resistant underlayer film, which would otherwise be used, can be omitted.

Then, a planarizing film 5 and other gas barrier film are deposited optionally on the base material 2. The step of forming these films is optional, as a gas barrier film 3 essential in this embodiment is provided thereon.

Then, a ferromagnetic element is allowed to be present (present in the scattered form, the island form, or the thin film form) on the base material 2 (or on the planarizing film 5, etc. if they are provided). Various means allowing the ferromagnetic element to be present can be adopted as has been described above and they include deposition means such as sputtering, CVD, PVD, and ALD. When sputtering is used, the element contained in the plasma processing cathode (ferromagnetic element-containing compound 4) can be deposited on the base material surface S by controlling the composition of the plasma processing cathode.

Then, a gas barrier film 3 is deposited on the base material surface S where the ferromagnetic element is present. The deposition means for the gas barrier film 3 is also as has been described above and this embodiment can provide an effect to the deposition means under the plasma circumstance.

So long as the manufacturing method has a step of depositing the gas barrier film 3 on the base material surface S where the ferromagnetic element is allowed to be present, the manufacturing method may also optionally has various other steps, for example, a step of laminating a gas barrier film other than the gas barrier film 3, a step of forming a planarizing film, and a step of forming a transparent conductive film (as an electrode for an organic EL device or an electronic paper device) before and after the deposition step.

In accordance with the manufacturing method of the gas barrier sheet according to this embodiment, dissimilar materials (ferromagnetic element-containing compound 4 in this embodiment) have been deposited at the base material surface, which is considered to be avoided in the technical common knowledge. Nevertheless, the gas barrier property has remarkably been improved even when the deposition means is applied under the plasma circumstance.

[Manufacturing Apparatus for Gas Barrier Sheet]

Figure 3:
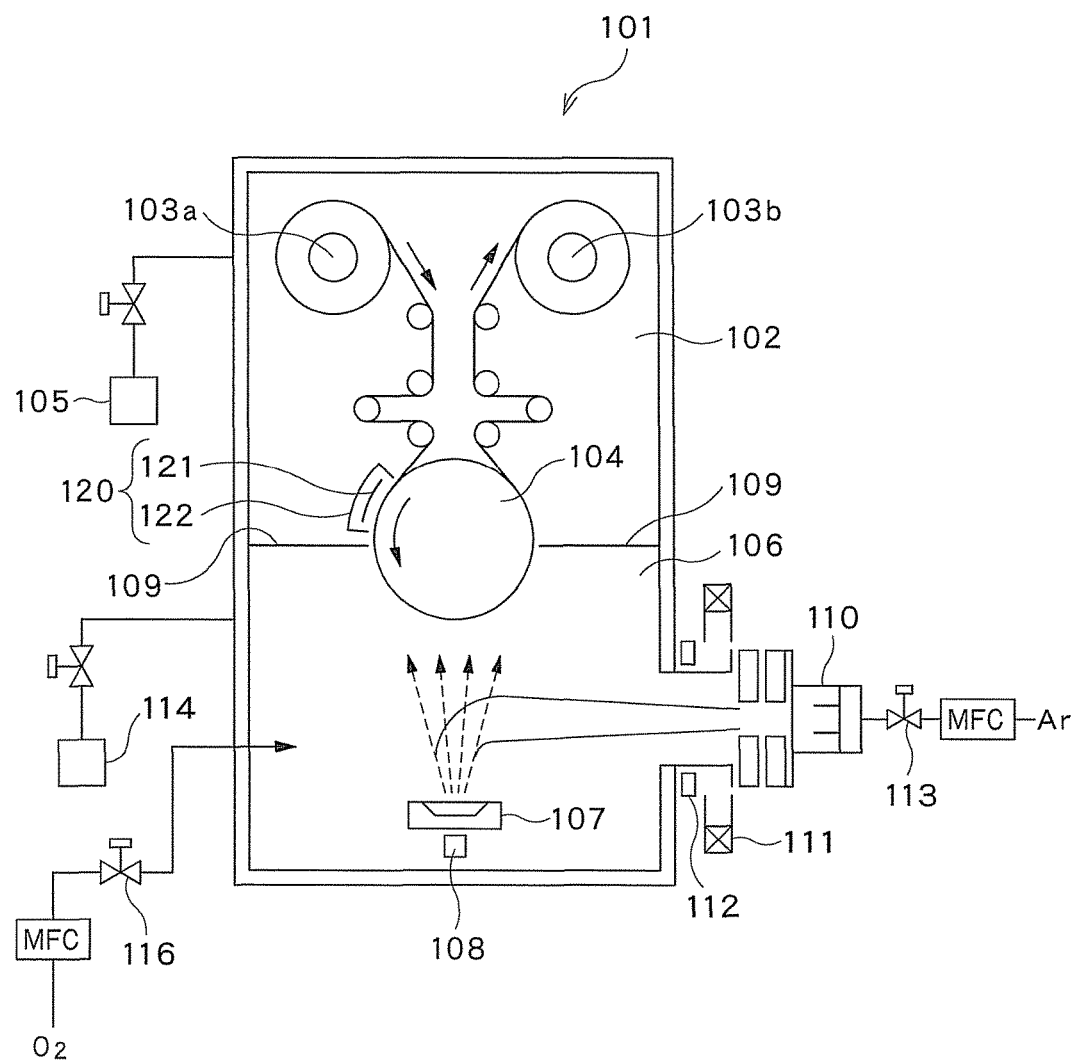
FIG. 3 is a schematic views showing an example of an apparatus for manufacturing a gas barrier sheet according to the invention.

An apparatus for depositing a gas barrier film will be described briefly. FIG. 3 is a structural view showing an example of an ion plating apparatus used for the deposition of a gas barrier film 3 of which a gas barrier sheet according to this embodiment is comprised. FIG. 3 illustrates a hollow cathode type ion plating apparatus used in the example to be described later. A hollow cathode type ion plating apparatus 101 shown in FIG. 3 has a vacuum chamber 102, a supply roll 103*a*, a take-up roll 103*b*, and a coating drum 104 which are provided in the chamber 102, a vacuum exhaust pump 105 connected by way of a valve to the vacuum chamber 102, partition plates 109 and 109, a deposition chamber 106 partitioned by the partition plates 109 and 109 from the vacuum chamber 102, a crucible 107 provided at a lower portion in the deposition chamber 106, an anode magnet 108, a pressure gradient type plasma gun 110, a focusing coil 111, and a sheeting magnet 112 provided at a predetermined position in the deposition chamber 106 (on the right side wall of the deposition chamber in the illustrated example), a valve 113 for controlling the feed amount of an argon gas to the pressure gradient type plasma gun 110, a vacuum exhaust pump 114 connected by way of a valve to the deposition chamber 106, and a valve 116 for controlling the supply amount of an oxygen gas, etc. As illustrated in the drawing, the supply roll 103*a* and the take up roll 103*b* each are provided with a reverse mechanism for enabling delivery and take-up in both directions.

Deposition of the gas barrier film 3 using the ion plating apparatus 101 described above is performed as below. First, the vacuum exhaust pumps 105 and 114 reduce pressure inside the vacuum chamber 102 and the deposition chamber 106 to a predetermined vacuum degree. When necessary, an oxygen gas, etc. are introduced by a predetermined flow rate into the deposition chamber 106. In this case, the pressure in the chamber 106 is kept at a predetermined pressure by controlling the opening degree of the valve between the vacuum exhaust pump 114 and the deposition chamber 106. Then, the base material film is fed, electric power is supplied for plasma generation to the pressure gradient type plasma gun 110 to which an argon gas has been introduced by a predetermined flow rate, and a plasma flow is focused and radiated to the crucible 107 on the anode magnet 108 thereby evaporating a evaporation source material. Then, evaporated molecules are ionized by a high density plasma to deposit a gas barrier film 3 of a predetermined kind at the base material surface S where the ferromagnetic element is allowed to be present. Thus, the gas barrier sheet 1 according to this embodiment is obtained.

A preferred ion plating apparatus has a feed back electrode such that current radiated to the hearth can stably be fed back to the plasma gun. As such an apparatus, an ion plating device as described in Japanese Patent Laid-Open No. 11-269636 may be used. This ion plating device has an insulating pipe and an electron feed back electrode at a plasma beam radiation exit portion of a plasma gun. The insulating pipe surrounds the periphery of a plasma beam and projects in an electrically isolated state. The electron feed back electrode surrounds the outer periphery of the insulating pipe and is set to a potential higher than that at the exit portion.

An example of the hollow cathode type ion plating apparatus is shown as the deposition apparatus for the gas barrier film 3. Needless to say, other apparatus allowing the gas barrier film 3 to be deposited under the plasma circumstance can also be used. While the example shown in FIG. 3 is an apparatus that enables a roll-to-roll method capable of continuous deposition of the gas barrier film 3 on a long base material sheet, a general batch type apparatus may be used.

The deposition apparatus for the gas barrier film 3 may be a film deposition apparatus for use under the plasma circumstance such as DC sputtering apparatus, magnetron sputtering apparatus, and plasma CVD apparatus in addition to the ion plating apparatus described above.

Means for allowing the ferromagnetic element to be present may be provided inside or outside of the film deposition apparatus for the gas barrier film. When the apparatus, as shown in FIG. 3, is used in which the feed roll 103*a* and the take-up roll 103*b* are arranged in the vacuum chamber 102, a device for depositing the ferromagnetic element as the ferromagnetic element-containing compound 4, for example, a sputtering device is preferably provided in the vacuum chamber 102 just before charging the base material sheet into the deposition chamber 106. Thus, operations for deposition of the ferromagnetic element-containing compound 4 and deposition of the gas barrier film 3 can be performed continuously and efficiently.

In the embodiment in FIG. 3, a sputtering device (plasma processing device 120) is provided inside the partition plate 109 (in vacuum chamber 102) that partitions the vacuum chamber 102 and the deposition chamber 106. The plasma processing apparatus 120 is exemplified as a structure where a plasma processing cathode 121 is arranged in a plasma casing 122.

Example

The present embodiment will be described more specifically with reference to examples and a comparative example.

Example 1

A polyethylene terephthalate (PET) film (commercial name: A4300 of 100 μm thickness, manufactured by Toyobo Co., Ltd.) was used for a base material 2. OELV 30 (commercial name) manufactured by The Inctec Co. was coated on the base material 2 to form a 5-μm-thick planarizing film 5. First, the base material 2 formed with the planarizing film 5 was located in a batch type vacuum chamber and a vapor deposition material (vapor deposition material: silicon oxide particles, manufactured by Kojundo Chemical Laboratory Co., Ltd.) was stored in a crucible within a vacuum chamber. Further, SUS3004 was placed as a plasma processing cathode (sputtering cathode) of DC magnetron.

Then, the evacuation chamber was evacuated to reach a vacuum degree of $9 \times 10^{-4}$, and then an argon gas was made to flow in the chamber at 120 sccm. Then, power of 0.6 kW (635 V, 0.9 A) was applied for 4.5 second to the plasma processing cathode and a ferromagnetic element was allowed to be present at the base material surface S. When elemental analysis was performed in this stage by using an XRF (fluorescence X-ray analyzer, Model RIX 3100 manufactured by Rigaku Corporation), iron element and Cr element were detected. The number of counts for iron elements was 0.64 kcps. Judging from results obtained by XRF, a ferromagnetic element was present in the scattered form or in the island form on the base material and it is considered that the ferromagnetic element-containing compound 4 (specifically, ferromagnetic element-containing oxide) is present in the state of the scattered form or the island form.

Then, an argon gas of 12 sccm and a discharging power were charged to the plasma gun to generate a discharging current of 99 A and a discharging voltage of 141 V, and a sublimation gas was plasmatized. A plasmatized sublimation gas flow comprising a plasmatized sublimation gas was deflected to a predetermined direction by generating a predetermined magnetic field across the focusing coils thereby applying plasmatized sublimation gas to the vapor deposition material in the vacuum chamber. The vapor deposition material is sublimated and ionized by the plasmatized sublimation gas. A 75-nm-thick gas barrier film 3 was deposited by depositing the ionized vapor deposition material to the base material surface S where the ferromagnetic element was allowed to be present (deposition of ferromagnetic element-containing compound 4). The time it took to practice ion plating was 6 second. Here, sccm is abbreviation for standard cubic per minutes which is used also in the following examples and comparative examples. In this way, a gas barrier sheet 1 according to Example 1 was manufactured.

When the water vapor permeability of the gas barrier film 3 was measured for the gas barrier sheet obtained, it was 0.03 g/m²/day. The water vapor permeability was measured by using a water vapor permeability measuring apparatus (TERMATRAN-W3/31 manufactured by Mocon Co.) at a temperature of 38° C. and at a humidity of 100% RH. When the total light transmittance was measured for the gas barrier sheet obtained, it was 92%. The total light transmittance was measured according to JIS-K7105 by using an apparatus manufactured by Suga Shikenki Co. (SM color computer-SM-C).

Figure 4:
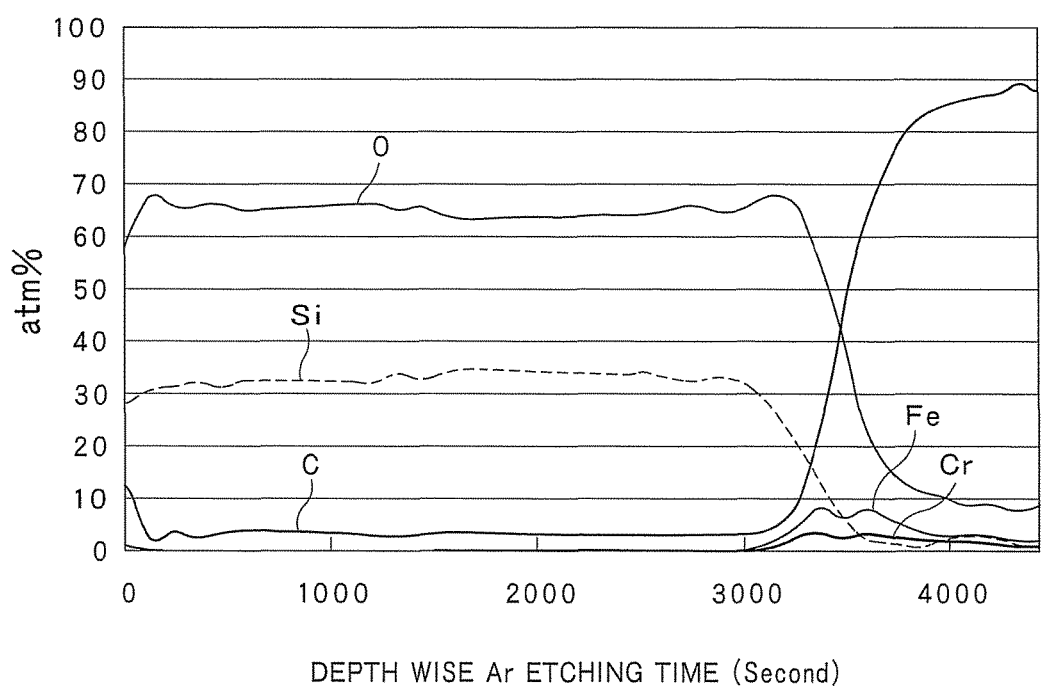
FIG. 4 shows the measurement results of XPS analysis in the direction of the depth, illustrating a ferromagnetic element is present at a boundary.

FIG. 4 is a graph showing the measurement results of XPS analysis in the direction of the depth, which results show that a ferromagnetic element is present at a boundary. The abscissa represents etching time in the direction of the depth and the ordinate represents at %. As a result of elemental analysis from the gas barrier film 3 to the base material surface S in the direction of the depth, while constant Si, O, and C were detected in the region of the gas barrier film 3, Fe and Cr were detected at the base material surface S (boundary). In the base material 2, C and O were mainly detected subsequently. Fe was 7.9 at % at the maximum and Cr was 3.0 at % at the maximum detected at the base material surface S (boundary). Fe and Cr detected therein are considered to be Fe and Cr contained in the plasma processing cathode (SUS304 is a typical steel species of 18% Cr-8% Ni austenitic stainless steel). Although not collected in the present data, Ni is also contained slightly. Note that Cr is not a ferromagnetic element.

It was confirmed that the distribution density of the ferromagnetic element at the base material surface S was 10% or less in term of an area in a plan view when it is distributed as the compound (ferromagnetic element-containing compound 4) in the scattered form or the island form. Further, it was confirmed from the results of XPS analysis that the ferromagnetic element such as Fe may be contained within a range of about 3 to 12 at %. It is considered that the ferromagnetic element, etc. such as Fe present at the boundary are in the form of an oxide.

Examples 2 to 4

A steel plate containing only Fe (Example 2), a corrosion resistant alloy steel plate containing Fe and Ni (Example 3), and a martensitic steel plate containing Fe and Co (Example 4) used as sputtering targets as in Example 1 were sputtered under the same conditions as those in Example 1 and the ferromagnetic element was allowed to be present at the base material surface S. Gas barrier sheets of Examples 2 to 4 were manufactured in the same manner as in Example 1 except for sputtering targets described above.

The water vapor permeability of the gas barrier film 3 was measured for the manufactured gas barrier sheets, as a result of which values ranging from 0.001 to 0.05 g/m²/day were obtained. Further, from the result of the XPS elemental analysis in the same manner as in Example 1, it was confirmed that the ferromagnetic element may be contained within a range of 3 to 12 at % in the same manner as in Example 1. For the distribution density of the ferromagnetic element (Fe, etc.), the area in a plan view was optionally changed within the range of 10% or less by changing and controlling the sputtering conditions (applied power, discharging current, discharging voltage, time) of the ferromagnetic element.

Example 5

A polyethylene terephthalate (PET) film (commercial name: A-4100 of 100 μm thickness, manufactured by Toyobo Co., Ltd.) was used as the base material 2. The base material 2 was located in a batch type vacuum chamber without such a planarizing film 5 as provided in Example 1. A vapor deposition material (vapor deposition material: silicon oxide particle+zinc particle, Si:Zn weight ratio=100:

30, manufactured by Kojundo Chemical Laboratory Co., Ltd.) was stored in a crucible of the vacuum chamber. Further, same SUS304 as in Example 1 was provided as a plasma processing cathode for DC magnetron sputtering.

Then, the evacuation chamber was evacuated to reach vacuum degree of $9\times10^{-4}$, and then an argon gas was made to flow in the chamber at 120 sccm. Power of 0.4 kW (573 V, 0.7 A) was applied for 9 second to the plasma processing cathode thereby allowing a ferromagnetic element to be present at the base material surface S. The gas barrier film 3 was deposited to the base material surface S where the ferromagnetic element was allowed to be present in the same manner as in Example 1. The time it took to practice ion plating was 12 second and the thickness of the gas barrier film was 120 nm. In this way, the gas barrier sheet 1 according to Example 5 was manufactured.

When the water vapor permeability of the gas barrier film 3 was measured for the obtained gas barrier sheet in the same manner as in Example 1, it was 0.001 $g/m^2/day$. Further, according to the elemental analysis by XRF (fluorescent X-ray analysis), iron element and Cr element were detected. The number of count of the iron element was 0.90 kcps.

Example 6

Power of 0.8 kW (676 V, 1.1 A) was applied for 4.5 second to the plasma processing cathode thereby allowing the ferromagnetic element to be present at base material surface S. Further, ion plating was conducted for a time of 6 second. The thickness of the gas barrier film 3 was 112 nm. A gas barrier sheet 1 of Example 6 was manufactured in the same manner as in Example 5 except for the condition described above.

When the water vapor permeability of the gas barrier film 3 was measured for the obtained gas barrier sheet in the same manner as in Example 1, it was 0.03 $g/m^2/day$. Further, according to the elemental analysis by XRF (fluorescence X-ray analysis), an iron element and Cr element were detected. The number of count of the iron element was 0.98 kcps.

Example 7

A polyethylene terephthalate (PET) film (commercial name: A-4100 of 100 μm thickness, manufactured by Toyobo Co., Ltd.) identical with that of Example 1 was used as the base material 2 and a planarizing film 5 identical with that in Example 1 was provided on the base material 2. The thickness of the planarizing film 5 was 5 μm. Then, the base material was placed in a batch type vacuum chamber, and a vapor deposition material (vapor deposition material: silicon oxide particle+zinc particle, Si:Zn weight ratio=100:30, manufactured by Kojundo Chemical Laboratory Co., Ltd.) was stored in the crucible in the vacuum chamber. Further, SUS304 identical with that in Example 1 was provided as a plasma processing cathode for DC magnetron sputtering.

Then, the evacuation chamber was evacuated to reach a vacuum degree of $9\times10^{-4}$, and then power of 0.2 kW (482 V, 0.4 A) was applied for 4.5 second to the plasma processing cathode thereby allowing the ferromagnetic element to be present at the base material surface S. The gas barrier film 3 was deposited to the base material surface S where the ferromagnetic element was allowed to be present in the same manner as in Example 1. The time it took to practice ion plating was 6 second and the thickness of the gas barrier film 3 was 72 nm. In this way, a gas barrier sheet 1 according to claim 7 was manufactured.

When the water vapor permeability of the gas barrier film 3 was measured for the obtained gas barrier sheet in the same manner as in Example 1, it was 0.004 $g/m^2/day$. Further, according to the elemental analysis by XRF (fluorescent X-ray analysis), iron element and Cr element were detected. The number of count of the iron element was 0.43 kcps.

Example 8

Power of 0.1 kW (500 V, 0.2 A) was applied for 4.5 second to a plasma processing cathode thereby allowing the ferromagnetic element to be present at the base material surface S. Further, the time it took to practice ion plating was 6 second and the thickness of the gas barrier film 3 was 108 nm. A gas barrier sheet 1 according to Example 8 was manufactured in the same manner as in Example 5 except for the condition described above.

When the water vapor permeability of the gas barrier film 3 was measured for the obtained gas barrier sheet in the same manner as in Example 1, it was 0.05 $g/m^2/day$. Further, according to the elemental analysis by XRF (fluorescence X-ray analysis), an iron element and Cr element were detected. The number of current of the iron element was 0.22 kcps.

Example 9

The evacuation chamber was evacuated to reach a vacuum degree of $9\times10^{-4}$, an argon gas was made to flow in the chamber at 120 sccm and power of 0.6 kW (635 V, 0.9 A) was applied continuously to a plasma processing cathode to form a thin film (10 nm thickness) of a ferromagnetic element-containing compound 4 containing a ferromagnetic element at the base material surface S. Subsequent deposition of the gas barrier film 3 was performed in the same manner as in Example 1. Thus, a gas barrier sheet according to Example 9 was manufactured. The number of count obtained by XPS in the same manner as in Example 1 was 9.08 kcps.

Comparative Example

A gas barrier sheet according to Comparative Example 1 was manufactured in the same manner as in Example 1 except that no ferromagnetic element was allowed to be present at the base material surface S by using a molybdenum (Mo) plate as a plasma processing cathode. Ion plating was performed under the conditions that an argon gas of 12 sccm and a discharging power was supplied to a plasma gun at a discharging current of 70 A and at a voltage of 143 V. The time it took to practice ion plating was 6 second and the thickness of the gas barrier film was 85 nm. When the water vapor permeability of the gas barrier film 3 was measured for the gas barrier sheet obtained, it was 0.85 $g/m^2/day$.

What is claimed is:

1. A gas barrier sheet comprising:
   a base material; and
   a gas barrier film provided on the base material;
   wherein a plurality of discrete ferromagnetic elements are distributed as compounds in a scattered form or an island form and present only in direct contact with a surface of the gas barrier film on a side of the gas barrier film facing the base material, wherein the base material is a resin sheet or a resin film having a thickness of 3 μm or more and 150 μm or less, wherein the base material is flexible so that the base material can be taken up in a rolled shape, wherein a distribution density of the compounds containing the plurality of discrete ferromagnetic elements is 10% or less in terms of an area in a plan view, and wherein the plurality of discrete ferromagnetic elements are contained in the compounds within a range of about 3 to 12 at %.

2. The gas barrier sheet according to claim 1, wherein the gas barrier film is one member selected from inorganic oxide film, inorganic nitride film, inorganic carbide film, inorganic oxycarbide film, inorganic carbonitride film, inorganic oxynitride film, and inorganic oxycarbonitride film formed under a plasma circumstance.

3. The gas barrier sheet according to claim 1, wherein the base material comprises a base material sheet or a base material sheet having a planarizing film or other gas barrier film.

4. The gas barrier sheet according to claim 1, wherein the plurality of discrete ferromagnetic elements are one or more of iron, nickel, and cobalt.

5. A method of manufacturing a gas barrier sheet comprising the steps of:

providing a base material;

providing a plurality of discrete ferromagnetic elements distributed as compounds in a scattered form or an island form on a surface of the base material; and a step of forming a gas barrier film on the base material surface including the plurality of discrete ferromagnetic element compounds present thereon under a plasma circumstance, so that the plurality of discrete ferromagnetic element compounds are only in direct contact with a surface of the gas barrier film on a side of the gas barrier film facing the base material;

wherein the base material is a resin sheet or a resin film having a thickness of 3 μm or more and 150 μm or less, wherein the base material is flexible so that the base material can be taken up in a rolled shape wherein a distribution density of the compounds containing the plurality of discrete ferromagnetic elements is 10% or less in terms of an area in a plan view, and wherein the plurality of discrete ferromagnetic elements are contained in the compounds within a range of about 3 to 12 at %.

6. The method of manufacturing a gas barrier sheet according to claim 5, wherein the step providing the plurality of discrete ferromagnetic element is performed by a sputtering method.

7. The method of manufacturing a gas barrier sheet according to claim 6, wherein the plurality of discrete ferromagnetic elements are supplied from a cathode used in the sputtering method.

8. The method of manufacturing a gas barrier sheet according to claim 5, wherein the base material comprises a base material sheet or a base material sheet having a planarizing film or other gas barrier film.

9. The method of manufacturing a gas barrier sheet according to claim 5, wherein the plurality of discrete ferromagnetic elements are one or more of iron, nickel, and cobalt.

* * * * *